April 25, 1961
S. A. MATTSSON ET AL
2,981,248
SAW BLADES FOR STONE SAWING MACHINES
PROVIDED WITH HARD METAL CUTTERS
Filed March 2, 1959
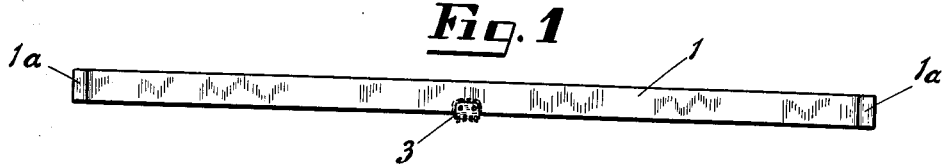
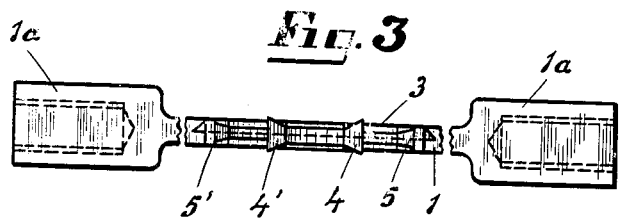
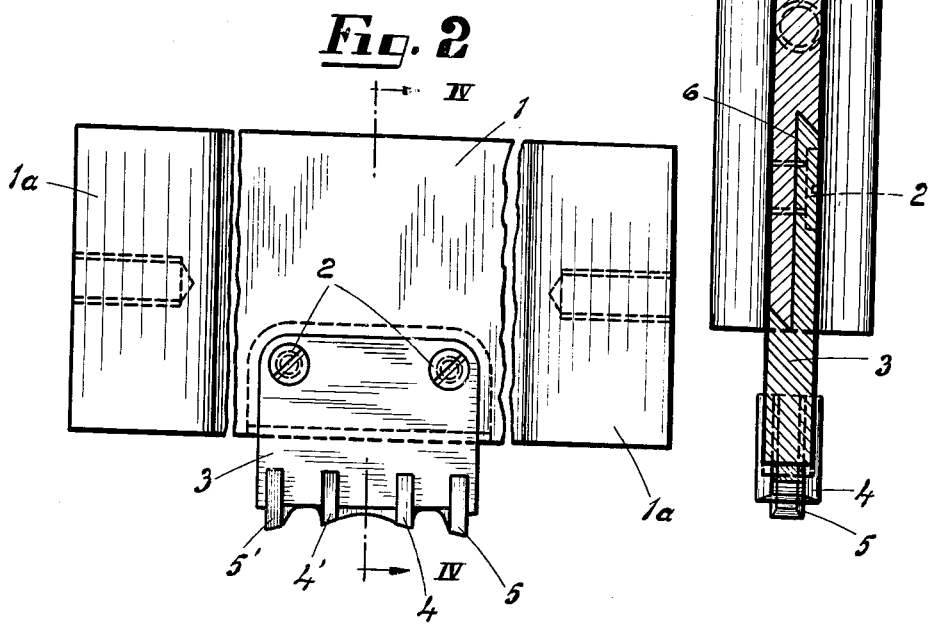
INVENTORS
SVEN AXEL MATTSSON
AND ARNOLD VALFRID KARLSSON
BY Linton and Linton
ATTORNEYS

United States Patent Office 2,981,248
Patented Apr. 25, 1961

2,981,248

SAW BLADES FOR STONE SAWING MACHINES PROVIDED WITH HARD METAL CUTTERS

Sven Axel Mattsson, Goteborg, and Arnold Valfrid Karlsson, Lysekil, Sweden, assignors to Skandinaviska Granit Aktiebolaget, Goteborg, Sweden Filed Mar. 2, 1959, Ser. No. 796,434

1 Claim. (Cl. 125—18)

The present invention relates to saw blades for stone sawing machines provided with hard metal cutters which are carried by a cutter plate having thick and thin portions of which the thin portion is disposed in a lateral recess of the saw blade at the working edge thereof and secured to the saw blade by means of screws or the like.

During the first part of the sewing of a work-piece having its upper surface inclined relative to the direction of sawing, or the sawing of substances such as marble containing hard pieces embedded in a softer body, the cutter plate may be subjected to large forces in a lateral direction.

The invention, which has for its object to overcome this drawback, is characterised in that the transition between said thinner and thicker portions of said cutter plate is channelled for receiving the saw blade edge portion (preferably bevelled) situated adjacent said recess.

One embodiment of the invention is illustrated in the accompanying drawing in which:

Figure 1 is a side view of an improved saw blade according to the invention;

Figure 2 is a side view to a larger scale with the saw blade partly broken away;

Figure 3 shows the saw blade seen from the under side; and

Figure 4 is a cross section to a still larger scale through the saw blade taken on the line IV—IV in Figure 2.

The saw blade 1 is in known manner provided with enlarged end portions 1a for anchoring the saw blades in a reciprocable saw blade frame (not shown). At its middle portion, the saw blade is provided with a cutter plate 3 secured to the saw blade at the lower edge thereof by means of screws 2. The hard metal cutters 4, 5, 4', 5' which are arranged in groups are secured to the edge portion of the cutter plate 3 which depends from the lower edge of the saw blade. The cutters are so shaped that, when the saw blade performs a stroke to the right according to Figure 2, the leading cutter 5 mainly works only the middle portion of the bottom of the kerf cut into the work piece, while the following cutter 4 works the side portions of the kerf bottom. The sawing is thus facilitated and the granular and pulverulent stone material cut away from the work piece may be readily flushed away. Before the saw blade begins its return movement, the saw blade frame is pivoted slightly around a horizontal medial axis in counter-clockwise direction (according to Figures 1 and 2) so that the cutters 4', 5' will engage the work piece, while the cutters 4 and 5 are inoperative.

The cutter plate 3 comprises thick and thin portions. In the lower edge on one side of the saw blade 1 there is provided a recess 6, the shape of which corresponds to the shape of the thinner portion of the cutter plate. As appears from Figures 2 and 4, the recess is provided with undercut edges and the thinner portion of the plate 3 is correspondingly bevelled. At the transition between the thicker and thinner portions the plate 3 is undercut in a similar manner and adapted to engage a bevelled portion of the lower edge of the saw blade, said edge portion extending along the recess 6.

The invention is not limited to the embodiment hereinbefore described and as shown in the accompanying drawing, said embodiment being susceptible of various modifications within the scope of the invention. For example, the thinner portion of the cutter plate 3 may be of semi-circular or other arcuate shape.

What we claim is:

A stone saw comprising a blade having a working edge and sides contiguous with said edge, said blade having a recess in one of said sides opening in said working edge, said blade recess being defined by undercut inner edges and a bottom, said working edge having a bevelled portion adjacent said recess extending from said recess bottom to the other side of said blade, a cutter plate having a thick and a thin portion with said thin portion mating within said recess, said plate having a portion between said thick and thin portions providing an undercut shoulder mating with said blade working edge bevelled portion, means retaining said plate thin portion fixedly connected to said blade and metal cutters carried by said blade thick portion.

References Cited in the file of this patent

UNITED STATES PATENTS

| 869,574 | Huther | Oct. 29, 1907 |
| 1,711,016 | Dubois | Apr. 30, 1929 |

FOREIGN PATENTS

| 7,941 | Great Britain | Apr. 27, 1892 |
| 326,771 | France | Nov. 27, 1902 |